No. 817,027. PATENTED APR. 3, 1906.
T. H. H. WIDDICOMBE.
MEANS FOR CUTTING UP LARGE BLOCKS OF BUTTER INTO SMALLER BLOCKS OF PREDETERMINED SIZES.
APPLICATION FILED NOV. 21, 1905.
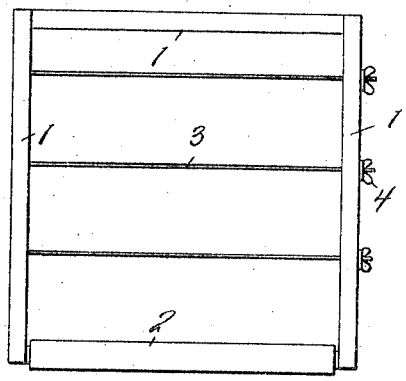
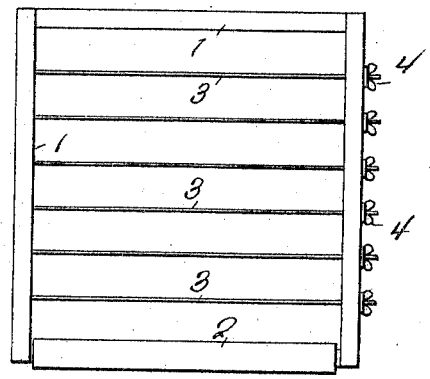
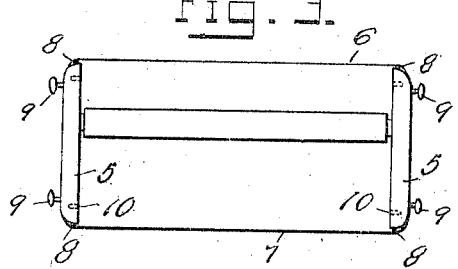
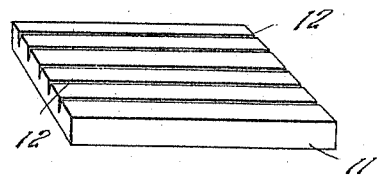
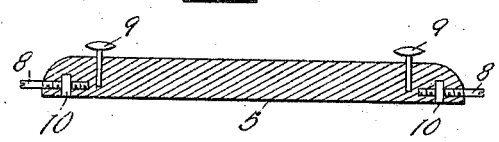
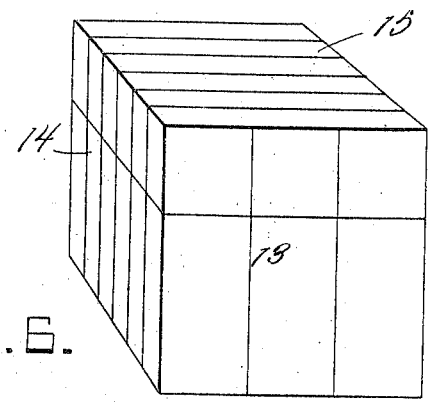
Witnesses
G. R. Thomas
L. B. Middleton
Inventor
Thomas Henry Herbert Widdicombe
By Richards & Co.
Attorneys

UNITED STATES PATENT OFFICE.

THOMAS HENRY HERBERT WIDDICOMBE, OF HOBART, TASMANIA, AUSTRALIA.

MEANS FOR CUTTING UP LARGE BLOCKS OF BUTTER INTO SMALLER BLOCKS OF PREDETERMINED SIZES.

No. 817,027.  Specification of Letters Patent.  Patented April 3, 1906.

Application filed November 21, 1905. Serial No. 288,458.

*To all whom it may concern:*

Be it known that I, THOMAS HENRY HERBERT WIDDICOMBE, a subject of the King of Great Britain, residing at Hobart, in the State of Tasmania, Commonwealth of Australia, have invented a new and useful Means for Cutting Up Large Blocks of Butter into Smaller Blocks of Predetermined Sizes; and I do hereby declare the following to be a full, clear, and exact description of the same.

This invention relates to means whereby a large block of butter may be divided up into smaller blocks.

Butter is frequently put into cubes for storage, the cubes being, say, fifty-six pounds or more in weight. These are sold to provision dealers or merchants, who cut them up for retail trade. By means of my invention such a block may be cut up into a predetermined number of one-pound and half-pound or other-sized blocks.

In carrying the invention into effect I make use of rectangular-shaped frames somewhat larger than the block of butter, in which wires are stretched, said wires being arranged at certain distances apart in the frames. One frame is used to make vertical cuts in the block, a second to make cuts at right angles to the first, and a third is adapted to make a horizontal incision across those already made. Means are provided for keeping the wires taut and to adjust the depth of the horizontal cut.

In the accompanying drawings, Figure 1 is a plan of a frame with wires arranged for wide cuts. Fig. 2 is a similar view of a frame for closer divisions, and Fig. 3 a plan of frame for horizontal cut. Fig. 4 is an enlarged sectional view of one of the sides of frame used in Fig. 3, showing means for adjusting the wires to regulate the depth of cut. Fig. 5 is a block on which a cube of butter is placed for division. Fig. 6 shows a cube of butter partly cut up with my device.

Two rectangular-shaped frames are constructed with sides 1 1 and bases 2 2. Wires 3 are stretched across the frames and are kept taut by nuts 4 or by other suitable means. The frames shown in Figs. 1 and 2 are the same size, but there are only half as many wires in Fig. 1 as in Fig. 2. The base of the frames may be a plain bar or roller, as shown, for the purpose hereinafter to be explained.

Fig. 3 is an H-shaped frame, in which the cross-piece 4 has the same function as the bar or roller 2 and supports the side pieces 5 5. The distance between the cross-piece 4 and the lower ends of the pieces 5 5 is about double that between said cross-piece and the upper end of the pieces 5 5. Wires 6 and 7 are stretched between the said side pieces, the wire 7 being about twice the distance from the cross-piece 4 as is the wire 6. The ends of the wires 6 and 7 are taken over bolts 8 in the extremities of the pieces 5 and are attached to pegs 9 in the side pieces, which pegs are adapted to be rotated and to tighten or wind in the wires when necessary. Said bolts mesh with nuts 10 set in recesses near the ends of sides 5, and by means of the bolts and by loosening the pegs the distance of the wires 6 and 7 from the bar 4 may be adjusted according to circumstances.

In Fig. 5, 11 is a block, preferably of wood, in which are grooves 12, so arranged that when the frame shown in Fig. 2 is placed thereon the wires of the frame will coincide with the grooves in the block. Upon this block a cube of butter is placed preparatory to division, and the frame with the greatest number of wires is laid upon its top face and gently pressed downward through the mass. By means of the grooves 12 a clean cut right through the block can be made with the wires. The bar or roller 2 of the frame is placed upon the face of the block nearest the operator, who is careful to keep the same in contact with the block during the operation of parting. The bar or roller serves to guide the frame. When the wires have passed through the butter, the block will be divided into six upright parallel slabs. The frame shown in Fig. 1 is used in the same way, only at right angles to the first frame. The result will be a further division of the butter into smaller slabs. The frame shown in Fig. 3 is now used to make the horizontal cuts necessary to part the slabs so formed into small rectangular blocks weighing half a pound or one pound, respectively. The frame is held in an upright position with the bar or roller 4 upon the top face of the block and the wire 6 is drawn through the mass. This should give half-pound blocks if the wire has first been properly adjusted. If the position of the frame is reversed and the wire 7 drawn through the butter, it will part off one-pound blocks, after which the horizontal action is repeated according as it is required to have the smaller or larger blocks of butter and until the whole cube has been reduced.

The adjustment of the frame illustrated in Fig. 3 is made by releasing the tension on the wire by reversing the pegs 9 and screwing the bolts 8 in or out as it is desired to place the wires 6 or 7 nearer to or farther from the bar or roller 4. This done, the wires are replaced on the bolts and the pegs again screwed up.

Fig. 6 shows a large cube of butter partly cut up with my apparatus. The frame shown in Fig. 2 is first placed over the block and the wires guided through it with the bar or roller 2 upon the face 13 thereof. The other frame, Fig. 1, is then used to make the cross-cuts from the face 14, and, lastly, the H-shaped frame, Fig. 3, is used in the manner explained to form the horizontal incisions, the bar or roller 4 traversing the face 15 meanwhile. After each cut of the last-mentioned frame the pieces are removed and the cut made until the cube has been used up.

It will be understood that other weights beside half and one pound blocks may be obtained by means of my apparatus and that the distance of the wires from each other in frames may be previously arranged by the operator to obtain blocks of the required measurement and weight.

Having thus described my invention, what I claim as new, and desire to secure by Letters Patent of the United States, is—

1. A device for cutting butter comprising a frame, wires stretched between the sides of the frame and a guiding-roller forming a cross-piece between the sides of the frame, said roller having its bearings held stationary in the frame and its periphery contacting with one surface of the block of butter.

2. The combination with a cross-piece or roller 4, of side pieces 5, 5, and wires stretched between the side pieces on either side of the cross-piece, one wire being about twice the distance from said cross-piece as the other wire, bolts in the ends of the side pieces that mesh with nuts recessed therein, said wires taking into the bolt's ends, and pegs set in the side pieces which are adapted to wind in the wires, as specified and set forth.

In testimony whereof I have signed this specification in the presence of two subscribing witnesses.

THOMAS HENRY HERBERT WIDDICOMBE.

Witnesses:
STANLEY SANDFORD STEKELL SCHOFIELD,
PERCY HELDER PRETYMAN.